US005352472A

United States Patent [19]
Lucke

[11] Patent Number: 5,352,472
[45] Date of Patent: Oct. 4, 1994

[54] METHOD AND APPARATUS FOR PRODUCING A FROZEN CRUST ON A FOOD LOAF

[75] Inventor: Donald E. Lucke, Madison, Wis.

[73] Assignee: Oscar Mayer Foods Corporation, Madison, Wis.

[21] Appl. No.: 62,097

[22] Filed: May 14, 1993

[51] Int. Cl.[5] ........ A23P 1/00
[52] U.S. Cl. ........ 426/518; 62/341; 165/80.5; 426/524
[58] Field of Search ........ 426/524, 518; 62/320, 62/341; 165/80.5

[56] References Cited

U.S. PATENT DOCUMENTS 4,583,375 4/1986 Sasaki ........ 62/341
4,943,442 7/1990 Schack et al. ........ 426/524

OTHER PUBLICATIONS

Brochure of InstaCool, Inc.
Brochure of Liquid Carbonic Company–Freeze Drum System.
Brochure of Liquid Carbonic Corporation–Freeze Wheel System.
One sheet insert describing a "Nitro Shield" system by Liquid Carbonic Corporation.
Brochure of Liquid Carbonic Corporation, 1990–Liquid Nitrogen Food Freezing.
Brochure of the Liquid Carbonic Corporation, 1988–Total Capability in Carbon Dioxide.

*Primary Examiner*—George Yeung
*Attorney, Agent, or Firm*—Lockwood, Alex, FitzGibbon & Cummings

[57] ABSTRACT

An apparatus and process are described for quickly freezing the surface of certain loaf-shaped products prior to slicing. The apparatus of the invention includes a heat exchanger having a shaped contact surface thereon. The heat exchanger is positioned to hold and support a food loaf and refrigerant is circulated continuously therethrough to provide the contact surface at a fairly constant temperature. A retractable clamp applies pressure to the opposite side of the food loaf to compress the loaf against the refrigerated contact surface and thereby accelerate the crusting cycle. After a short cycle time of between about 30 and about 90 seconds, the clamp can be retracted and the loaf can be ejected onto a slicer feed for subsequent slicing thereof. In a second embodiment, the clamp is provided as a second heat exchanger to compress the food loaf against the contact surface of the first heat exchanger while simultaneously crusting at least one of the opposing sides of the loaf.

18 Claims, 1 Drawing Sheet

METHOD AND APPARATUS FOR PRODUCING A FROZEN CRUST ON A FOOD LOAF

BACKGROUND AND BRIEF DESCRIPTION OF THE INVENTION

The present invention generally relates to an apparatus and a method for processing food products and to generally improve the time constraints required for processing such food products by providing a rapid cycle, low cost, controlled method which represents a substantial improvement over previous devices and methods. More specifically, the invention relates to an apparatus and a method for producing a frozen crust surface on a loaf or stick-shaped meat product using a refrigerated heat exchange surface for direct, pressure-controlled contact with the surface of the food product. The invention provides a rapid cycle, low cost, controlled method and an apparatus for producing a frozen crust condition on the food loaf prior to slicing. Subsequent slicing of the crusted food product provides a significant improvement in slice quality and allows a faster slicer output for many applications.

In the preparation of sliced meat products, for example, the end product is often prepared by slicing a previously formed loaf or log. In the preparation of such sliced products, it has been recognized that certain advantages can be realized during the slicing step if the loaf is at least partially frozen when sliced. In particular, it would be desirable to form a frozen crust along at least a portion of the outermost surface of the loaf. It would also be advantageous to form such a frozen crust using freezing technology which could be efficiently utilized within a manufacturing line to form a frozen crust within seconds rather than minutes, quickly preparing the loaf for subsequent slicing. While cooling or freezing processes are known, existing technologies have failed to provide suitable systems or devices to rapidly produce frozen crust conditions on loaf products prior to slicing.

Available devices and processes for cooling or freezing certain food products have generally attempted to provide relatively quick cooling or freezing times for certain foods while also preserving food quality such as taste, texture and the like. Cryogenic freezing and cooling has employed the use of heat exchangers, utilizing a circulating coolant such as carbon dioxide, liquid nitrogen, ammonia or the like to maintain a maximum temperature differential between the unfrozen food product and the heat exchange surface. Yet, the utility of heat transfer technology in the preparation of sliced products has been limited by excessively lengthy freeze time requirements and the need for bulky and expensive equipment. For example, the time requirements for adequately preparing certain crusted meat products using existing heat exchange devices has typically exceeded five or more minutes. Available heat exchange devices have been quite bulky, requiring sealed cabinets, tunnels and other enclosed cabinet-like structures which require much space, are complicated in their operation and are quite costly.

The present invention overcomes the noted problems of the prior art by providing an apparatus and process for cryogenically crusting certain loaf products prior to slicing. The apparatus is adapted for inclusion in a process line and specifically for producing a frozen crust surface on a loaf or a log product by compressing the loaf against a refrigerated heat exchange surface. The crusted loaf may then be sent downstream to a slicer where the frozen crust improves slicing conditions, producing a sliced product of higher quality than was previously available and, in some applications, allowing for a faster slicer output. The apparatus and method of the invention provide a rapid cycle, low cost, controlled means for producing a frozen crust and the apparatus requires less operating space in comparison to bulky prior art commercial cabinet systems, making it well-suited for inclusion in an automated continuous loaf product slicing operation.

In a preferred embodiment, a heat exchanger is provided with a shaped contact surface and the heat exchanger is positioned to support a food loaf directly on the contact surface. Refrigerant is circulated continuously through the heat exchanger, maintaining the contact surface at a fairly constant low temperature. A retractable clamp applies pressure to the opposite side of the food loaf to compress the loaf against the refrigerated contact surface and thereby accelerate the crusting cycle. After a short cycle time of between about 30 and about 90 seconds, the clamp can be retracted and the loaf can be ejected onto a slicer, located downstream, by a sliding or dumping action. The cycle can then be repeated for the next loaf and the contact surface can be periodically scraped to remove any frost build-up.

In an alternate embodiment of the invention, a movable second refrigerated heat exchanger is used in place of the retractable clamp to compress the food loaf against the contact surface of the first heat exchanger while simultaneously crusting one or more of the additional sides of the loaf.

Accordingly, it is an object of the present invention to provide a process and an apparatus for the preparation of certain food products.

It is another object of the present invention to provide a process and an apparatus utilizing a refrigerated heat exchange surface for producing a cryogenically frozen crust condition to at least a portion of the outer surface of a food loaf.

It is another object of the present invention to provide an apparatus and process for the preparation of food products which can be included in a process line.

It is another object to improve the quality of food products sliced from a loaf by providing an apparatus and process for rapidly imparting a frozen crust condition to the food loaf prior to slicing.

These and other objects of the present invention will be more fully understood and appreciated upon a consideration of the remainder of the disclosure, including the drawings and the detailed description of the preferred embodiments.

DETAILED DESCRIPTION OF THE PREFERRED EMBODIMENTS

Figure 1:
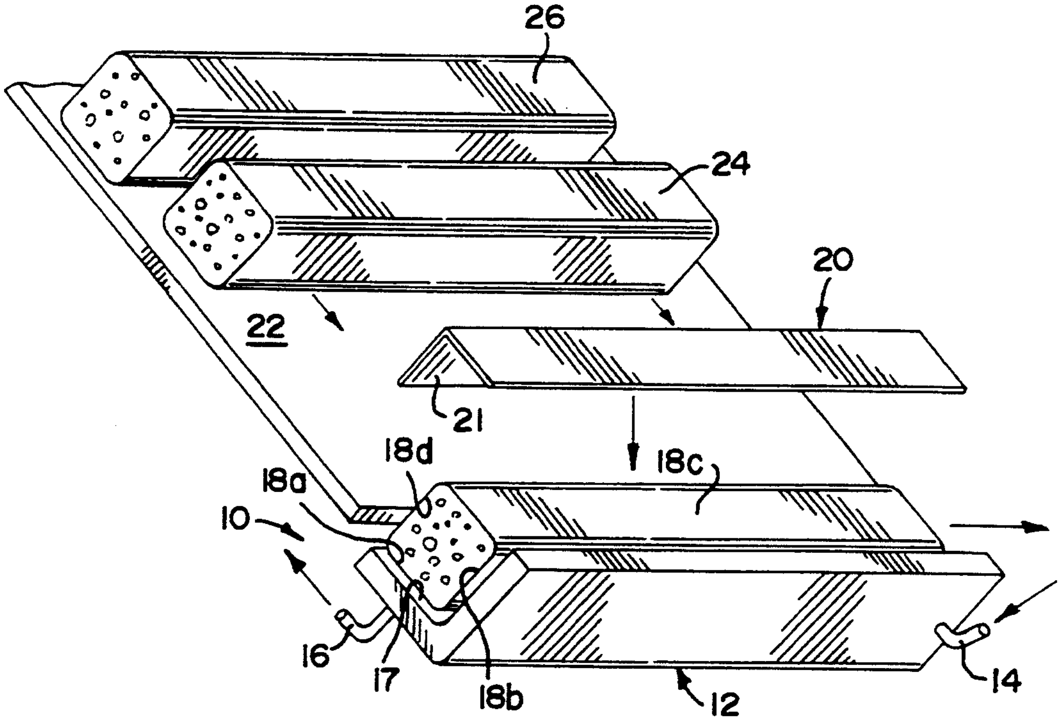
FIG. 1 is a perspective view, in schematic, of an apparatus according to with the present invention and showing one embodiment thereof.

Both an apparatus and a process are provided for producing a frozen outer crust on a food loaf or stick-shaped food product to prepare the food product for subsequent slicing. By the application of pressure, the outer surface of the food product loaf can be quickly frozen by direct contact with a refrigerated heat exchange surface. The crusting apparatus of the invention can be included within an automated continuous loaf slicing operation directly upstream of the slicer. Following the crusting operation, the loaf product is ejected onto a slicer infeed where it can be sliced and further processed. The frozen crust condition improves slice quality and in some applications allows for a faster slicer output. In describing the preferred embodiments, reference is made to the drawings wherein certain structures are designated by reference numerals with like reference numerals indicating like structures.

Referring now to the drawings, FIG. 1 depicts an apparatus according to a first preferred embodiment of the present invention. The loaf crusting apparatus 10 includes a refrigerated heat exchanger 12 equipped with inflow and outflow ports 14 and 16, respectively, for continuously cycling refrigerant through the heat exchanger 12. The heat exchanger 12 includes a first contact surface 17, having a configuration to match that of the loaf 18 to be crusted thereon. In the embodiment of FIG. 1, the heat exchange contact surface 17 is L-shaped to maintain direct contact with sides 18*a* and 18*b* of the cross-sectionally squared loaf 18 when cradled in the heat exchanger 12. In this arrangement, sides 18*a* and 18*b* experience freezing because of their exposure to the surface 16. Food logs having other shapes may be crusted using heat exchangers with contact surfaces suitably configured to establish direct contact with the sides of the log to be crusted. Likewise, irregular surfaces or surface variations on the log or loaf may also be crusted by making the contact surface of the heat-exchanger from a conforming bladder-like material, for example.

A retractable clamp 20 is movably positioned over the contact surface 17 and the loaf 18. In the depicted embodiment, the retractable clamp 20 is L-shaped to complement the heat exchange surface 17 and the configuration of the loaf 18. A second contact surface 21 on the clamp 20 is applied to the loaf 18 at sides 18*c* and 18*d* to compress the surfaces 18*a* and 18*b* directly against the refrigerated first contact surface 17. While sides 18*a* and 18*b* can be crusted without the application of compressive force from the clamp 20, it has been found that the use of a clamp 20, or its equivalent, will significantly accelerate the crusting cycle time. The clamp 20 is retractable and can be positioned in a known manner between a first or retracted position where the clamp 20 is free from any contact with the loaf 18 and a second or engaged position where the second contact surface 21 is engaged against the sides 18*c* and 18*d*.

The loaf 18 may be loaded onto the first contact surface 17 from a table or tray 22 while the clamp 20 is in a first or retracted position. Once the loaf 18 is properly positioned on the surface 17, the clamp 20 may be lowered to its second position to apply a desired amount of pressure against the loaf 18 for a sufficient length of time to provide a desired frozen crust. The feeding tray 22 supports additional loaves 24 and 26 waiting to be positioned on the contact surface 17 after the loaf 18 has been crusted and ejected from the heat exchanger 12. The tray 22 is preferably positioned next to heat exchanger 12 to allow the additional loaves 24, 26 to be fed directly from the tray to the contact surface 17, substantially as indicated by the arrows in FIG. 1. It will be appreciated that the tray 22 can be replaced with an equivalent component such as a conveyor system or the like for automated feeding of the loaves to the contact surface 17. Periodically, a scraper may be passed over the contact surface 17 to remove frost therefrom.

Although the retractable clamp 20 and the heat exchanger 12 are shown for processing squared loafs of food products, such as the loaf 18, it is not intended that the invention be limited in any way to the depicted configuration. Other shaped loafs may similarly be processed according to the present invention and an apparatus for processing such loaves would utilize a retractable clamp and a heat exchanger conformed to the shape of the loaf or log being processed.

Figure 2:
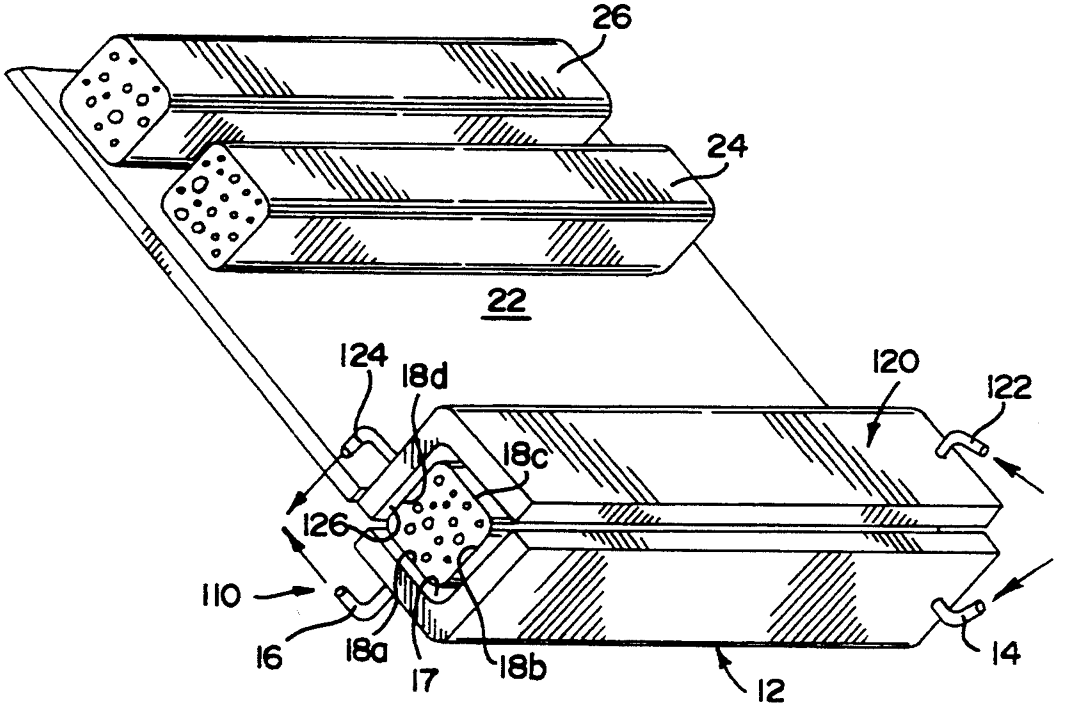
FIG. 2 is a perspective, in schematic, of an apparatus according to the present invention and depicting another embodiment thereof.

A second preferred embodiment is depicted in FIG. 2. Except as otherwise indicated, like elements are indicated with like reference numerals, and, the operation of the embodiment of FIG. 2, where identical to that of FIG. 1, will not be repeated. The apparatus 110 of FIG. 2 includes, in place of a retractable clamp, an additional heat exchanger 120 which, like the clamp 20 of FIG. 1, is also retractable. The second heat exchanger 120 is provided to impart a frozen crusted condition on the additional two sides 18*c* and 18*d* of the loaf 18. The apparatus 110 thereby provides loaf crusting on all four sides of the squared loaf 18. The retractable exchanger 120 compresses the loaf 18 between the contact surfaces 17 and 126 of the two heat exchangers to provide a frozen crust to all four sides of the loaf 18. Inflow and outflow ports 122 and 124, respectively, are provided to circulate refrigerant through the heat exchanger 120 and the surface 126 of the heat exchanger 120 is maintained at a fairly constant cryogenic temperature to provide for rapid crusting of the loaf 18.

It will be appreciated that other configurations for the heat exchangers 12 and 120 are available and are contemplated as within the scope of the invention. While the described heat exchangers are depicted as L-shaped, the specific configuration thereof can be varied to suit the individual application. For example, the heat exchanger could be U-shaped and the clamp 20 might be flat or U-shaped. Likewise, the contact surface could be made of a flexible bladder-like material, such as polyethylene, to crust irregular shapes and to accommodate surface variations on the logs or loaves. Such alternate configurations for either or both of the clamp and the heat exchanger are contemplated within the scope of the invention. The invention contemplates the use of at least one heat exchanger to impart a frozen crust condition to at least a portion of the surface of a food product to improve the quality of food slices obtained therefrom. The invention also contemplates the use of some type of clamping or pressure-inducing component to exert a beneficial amount of force to hold the food product against a heat exchange surface and thereby accelerate the crusting cycle.

Regarding the process of the invention, a food loaf 18 is cradled within a heat exchanger 12 on a contact surface 17 which is cryogenically cooled with a continuous flow of refrigerant through the heat exchanger 12. The loaf 18 is compressed against the contact surface 17 for a suitable period of time to impart the frozen crust condition to the portions of the loaf exposed to the contact surface. For meat products, a cycle time of between about 30 seconds and about 90 seconds is usually sufficient to provide the desired crusted condition but, the actual time period may be adjusted as necessary. In this manner, the loaf 18 is crusted along one or more sides thereof and after the cycle time has lapsed, the pressure applied to the loaf is released by withdrawing retractable clamp 20 (FIG. 1) or the retractable heat exchanger 120 (FIG. 2). The loaf 18 is then ejected onto a slicer end feed by either a sliding or a dumping action. The cycle is then repeated for the next loaf and a periodic scraping of the contact surfaces may be performed to remove frost buildup.

At slicing, the crusted condition of the loaf results in significant improvement to slice quality and, for some products and applications, allows for a faster slicer output. The compact design of the apparatus of the invention requires much less operating space in comparison to prior art commercial cabinet systems and the invention is readily adaptable for inclusion in an automated continuous loaf slicing operation.

While preferred embodiments of the invention have been disclosed and described, it will be appreciated that numerous modifications and changes to those preferred embodiments may be made by those skilled in the art without departing from the spirit and scope of the invention, as defined in the following claims.

I claim:

1. An apparatus for producing a frozen crust on at least a portion of the surface of a loaf-shaped food product, the apparatus comprising:

a heat exchanger having a first contact surface thereon; and clamping means associated with said heat exchanger for applying pressure to a food product to hold said food product against said first contact surface, said clamping means capable of applying sufficient pressure to said food product to impart a frozen crust thereon within less than about 90 seconds;

whereby, at least one surface of said food product is provided with a frozen crust to thereby improve the quality of food slices obtained therefrom.

2. The apparatus as defined in claim 1 wherein said heat exchanger includes circulating means for circulating coolant therethrough, said circulating means associated with said first contact surface to maintain said surface at a temperature sufficient to freeze a surface of said food product.

3. An apparatus for producing a frozen crust on at least a portion of the surface of a loaf-shaped food product, the apparatus comprising:

a heat exchanger having a first contact surface thereon wherein said first contact surface is L-shaped to provide a frozen crust condition on at least two sides of a squared food product; and clamping means associated with said heat exchanger for applying pressure to a food product to thereby hold said food product against said first contact surface to facilitate freezing thereof;

whereby, at least one surface of said food product is provided with a frozen crust to thereby improve the quality of food slices obtained therefrom.

4. The apparatus as defined in claim 1 wherein said pressure means includes a retractable clamp member with a second contact surface thereon, and positioning means to position said clamp member between a first position wherein said second contact surface is free from any contact with a food product and a second position wherein said second contact surface is in direct contact with said food product to hold said food product firmly against said first contact surface.

5. The apparatus as defined in claim 1 wherein said pressure means includes a second heat exchanger having a second contact surface thereon, said pressure means including positioning means for positioning said second heat exchanger in a first position free from any contact with a food product and a second position wherein said second contact surface is in direct contact with said food product to firmly hold said food product against said first contact surface.

6. The apparatus as defined in claim 5 wherein said second heat exchanger includes second circulating means for circulating a coolant therethrough, said second circulating means associated with said second contact surface to maintain said surface at temperatures sufficient to freeze a surface of said food product.

7. The apparatus as defined in claim 6 wherein said first and second contact surfaces are configured complementarily to impart a frozen crust condition to opposing sides of a food product placed therebetween.

8. An apparatus for producing a frozen crust condition on at least a portion of the surface of a loaf-shaped food product, the apparatus comprising:

a first heat exchanger having a first contact surface for supporting a food product thereon;

a clamp member in operative association with said first heat exchanger, said clamp member configured to apply pressure to said food product on said first contact surface, said clamp member holding said food product against said first contact surface to provide a frozen crust on a surface of said food product which improves the quality of food slices obtained therefrom, said clamp member capable of applying sufficient pressure to said food product to impart a frozen crust thereon within less than about 90 seconds; and means for positioning said clamp member between a first position free from any contact with said food product on said first contact surface and a second position wherein said clamp is maintained in direct contact with said food product.

9. The apparatus as defined in claim 8 wherein said first heat exchanger includes circulating means for circulating coolant therethrough, said circulating means associated with said first contact surface to maintain said contact surface at cryogenic temperatures.

10. The apparatus as defined in claim 8 wherein said clamp member includes a second heat exchanger with a second contact surface thereon, said second heat exchanger including second circulating means for circulating coolant therethrough and associated with said second contact surface to maintain said second contact surface at cryogenic temperatures.

11. The apparatus as defined in claim 10 wherein said first contact surface and said second contact surface are similarly configured to retain a shaped food product therebetween, said first and said second contact surfaces coacting to provide a frozen crust condition to opposing surfaces of said food product.

12. A process for preparing food slices from a loaf-shaped food product, the process comprising:

providing a heat exchanger having a first contact surface thereon for contacting a loaf-shaped food product;

positioning a loaf-shaped food product to contact said first contact surface;

maintaining said first contact surface at a temperature sufficient to freeze a surface of said loaf-shaped food product;

applying a clamping pressure to said food product to press said food product against said first contact surface to facilitate freezing thereof within a preset period of time of less than about 90 seconds; and slicing said food product after said product is at least partially frozen.

13. The process as defined in claim 12 wherein said maintaining of said first contact surface at a temperature sufficient to freeze a surface of said food product includes circulating a coolant through said heat exchanger.

14. The process as defined in claim 12 wherein said applying of a clamping pressure is accomplished by applying a clamp against a surface of said food product, said clamp moving from a first position free from contact with said food product to a second position in direct contact with a surface of said food product to thereby press said food product against said first contact surface.

15. The process as defined in claim 14 wherein said clamp is maintained in said second position for a period of between about 30 seconds and about 90 seconds.

16. The process as defined in claim 12 wherein said applying of a clamping pressure is accomplished by providing a second heat exchanger having a second contact surface thereon, said second heat exchanger moving from a first position free from any contact with a food product to a second position maintaining said second contact surface in direct contact with said food product.

17. The process as defined in claim 16 wherein said providing of a second heat exchanger includes providing second circulating means for circulating a coolant therethrough, said coolant maintaining said second contact surface at temperatures sufficient to freeze a surface of said food product.

18. The process as defined in claim 16 wherein said second contact surface is maintained in direct contact with said food product for a period of between about 30 seconds and about 90 seconds.

* * * * *